United States Patent [19]

Lower

[11] 4,251,354
[45] Feb. 17, 1981

[54] SCREENING MACHINE

[75] Inventor: William E. Lower, Cincinnati, Ohio

[73] Assignee: Rotex, Inc., Cincinnati, Ohio

[21] Appl. No.: 108,290

[22] Filed: Dec. 28, 1979

[51] Int. Cl.³ .............................................. B07B 1/28
[52] U.S. Cl. ................................... 209/240; 209/332; 209/371
[58] Field of Search ............... 209/240, 243, 246, 255, 209/259, 315, 325, 332, 370, 371, 373

[56] References Cited

U.S. PATENT DOCUMENTS

| 1,237,127 | 8/1917 | Watson et al. | 73/47 |
| 1,597,635 | 8/1926 | Stickdorn | 425/6 |
| 2,047,713 | 7/1936 | Simpson | 209/240 |
| 2,517,470 | 8/1950 | Erisman | 285/9 R |
| 2,665,795 | 11/1954 | Holwick | 198/204 |
| 2,828,980 | 4/1958 | Craig et al. | 285/163 |
| 3,047,152 | 7/1962 | Pollitz | 209/372 |
| 3,433,357 | 3/1969 | Nolte | 209/372 |
| 3,515,168 | 6/1970 | Tamny | 137/565 |

Primary Examiner—William A. Cuchlinski, Jr.
Attorney, Agent, or Firm—Wood, Herron & Evans

[57] ABSTRACT

A screening machine having an improved seal operable between the stationary inlet and outlet conduits of the machine and the movable inlet and outlet ports of the screen enclosure. The improved seal comprises a low friction slideable ring movable relative to a slide surface on one or the other of the conduit or the screen enclosure.

10 Claims, 5 Drawing Figures

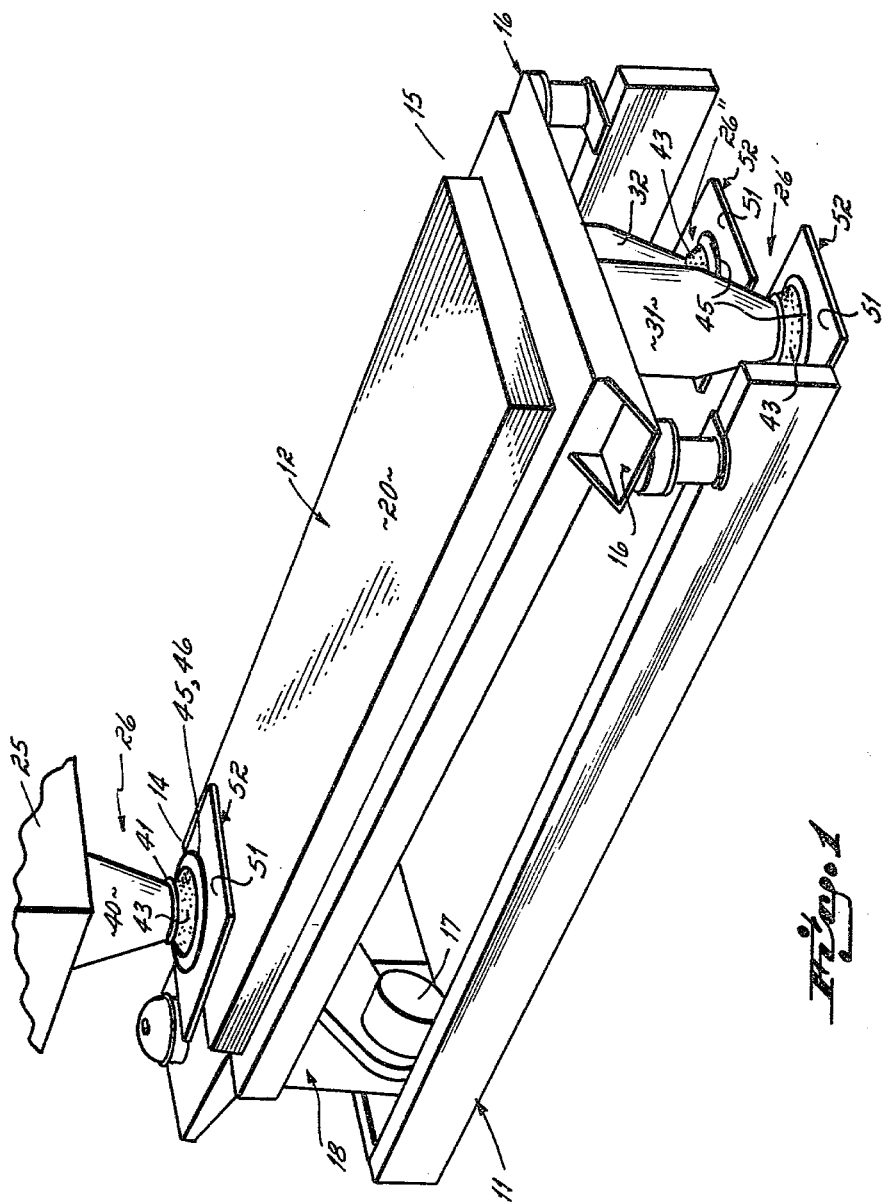

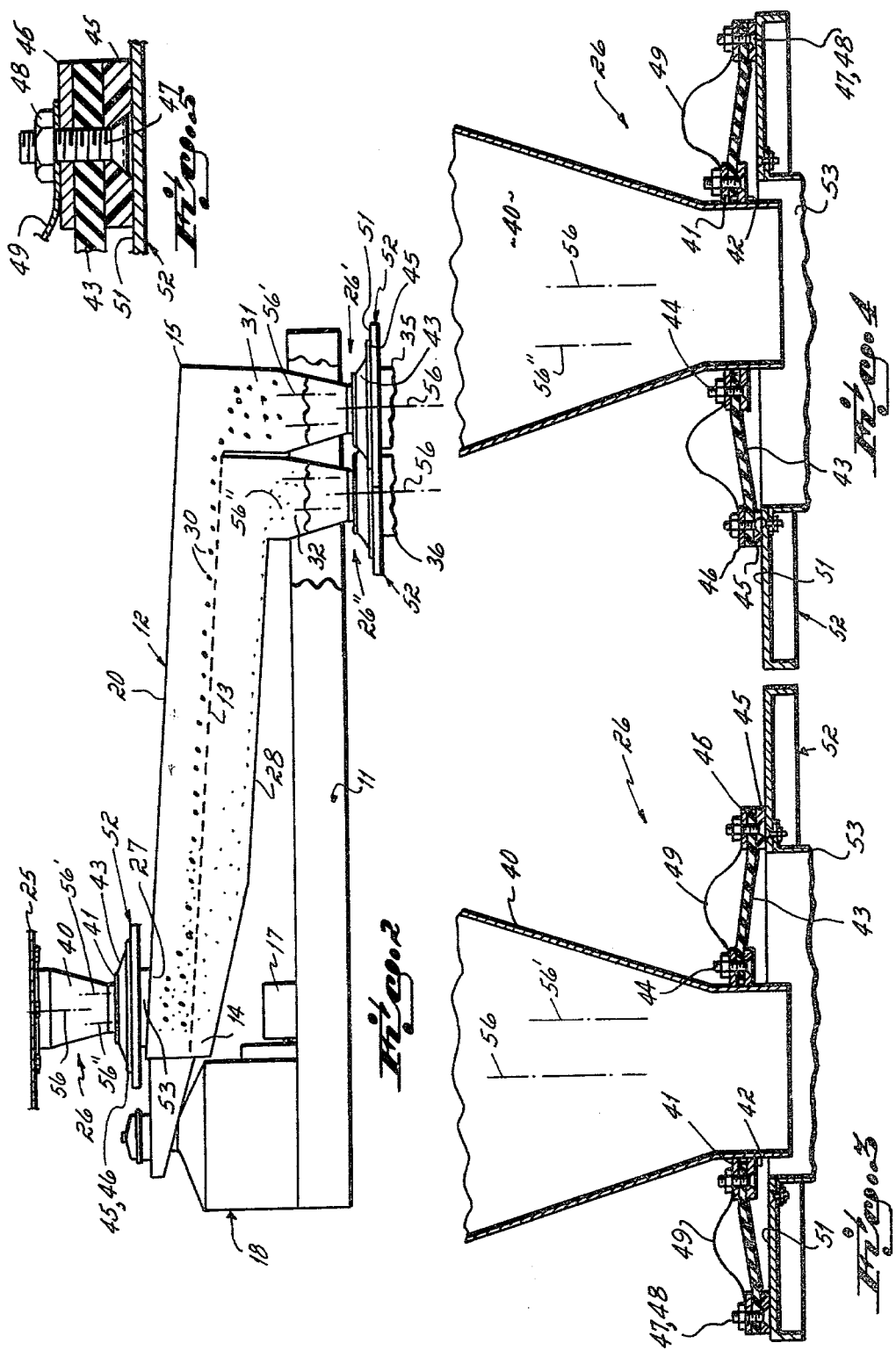

SCREENING MACHINE

The present invention relates to material grading machines of the type which employ a screen to size, sift, or separate particulate material by vibratory, oscillatory, or gyratory motion of the screen. Such machines are generally referred to as screening machines.

Material screening machines of the type with which the present invention is concerned are well-known and have long been in use commercially, a typical one for instance being shown in U.S. Pat. No. 2,047,713 to L. E. Simpson. Essentially, these screening machines employ one or more sloping screen decks enclosed within a boxlike structure to separate or grade particulate material.

The material is fed into the screen enclosure or so-called screen box from a feed source, such as a chute or elevator onto the upper portion of the sloping screen deck. By vibrating or shaking the entire screen box selected grades of the material are caused to pass down through the screen deck within the box. Ungraded material or so-called tailing remains on top of the screen but slide from the upper end down the slope of the screen to the lower end. The graded material which has passed through the screen deck is then removed from a bottom opening and the tailings are either extracted from an end opening as they fall off of the screen deck or are removed via another bottom opening in the screen box.

Since the enclosed screen box moves in a gyratory or vibratory sifting motion relative to the stationary feed chute and bottom outlet collectors, some provision must be made for accommodating that motion while still maintaining a seal between the stationary feed and outlet chutes. In the absence of such a seal, a great deal of dust would escape from the machine during operation of the unit and/or dust would be permitted ingress into the machine to contaminate product contained there. The ingress and/or egress of dust to and from the machine is generally unacceptable and for that reason it has been the practice to interconnect the stationary feed chutes and outlet chutes of the machine to the movable screen box via some form of flexible conduit. The most common form of such conduit now in use is a corrugated hose coupling of the type disclosed in the above identified U.S. Pat. No. 2,047,713

Problems occur with resilient corrugated flexible hose couplings or sleeves in that they are subject to failure as a consequence of the rubber within the corrugated sleeve or hose failing at an unacceptably high frequency. Additonally, the natural rubber material of which the hoses are generally made are unacceptable for numerous applications, as for example high temperature applications.

It has therefore been an objective of this invention to provide an improved seal operable between a stationary feed hopper or conduit and a vibratory feed box, or operable between a stationary outlet hopper or conduit and the same vibratory screening box.

The improved seal of this invention is a sliding seal in which a low friction sliding plate or ring is sealingly connected to the inlet or outlet conduit via a flexible diaphragm and is spring biased into engagement with a flat surface so as to effect a sliding resilient seal between the movable and stationary sections of the machine. In the preferred embodiment the sliding seal is effected by a low friction Teflon ring, secured to a flexible rubber diaphragm. Other low friction materials though would accomplish the same purpose of maintaining a seal while still accommodating movement between the stationary and movable sections of the machine.

I have found that the seal of this invention effects an improved seal life three or four times that of a corrugated seal or hose of the type now being commercially utilized in most applications. Consequently, there are many fewer spills resulting from seal failure than have heretofore been the experience with corrugated sleeves.

This new seal also has the advantage of being useful, in many applications where corrugated sleeves are unacceptable, as for example in high temperature applications.

These and other objects and advantages of this invention will be more readily apparent from the following description of the drawings, in which:

FIG. 1 is a perspective view of a screening machine of the type with which the improved seal of the present invention may be utilized;

FIG. 2 is a side elevational view, partially broken away, of the machine illustrated in FIG. 1;

FIG. 3 is a cross-sectional view through the inlet conduit and through the seal around that conduit;

FIG. 4 is a view similar to FIG. 3, but illustrating the movable part of the seal at its opposite extreme of movement from that illustrated in FIG. 3; and FIG. 5 is an exploded cross-sectional view of a portion of the seal illustrated in FIG. 3.

The improved seal of this invention is typically utilized with screening machines which may be of the type shown in FIGS. 1 and 2 for purposes of illustration. Such machines may be as much as 15 feet long and may weigh several tons. The machines includes a base 11 and a screen box 12. Within the screen box there is mounted one or more parallel screens 13. The screen box slopes downwardly from the inlet end 14 toward the outlet end 15. At its lower end, the screen box 12 rests on slide pads 16. At its upper end or head, the screen box is driven by an electric motor 17 through an eccentric or other screening motion creating means 18, which imparts an oscillatory, gyratory or rotary motion to the screen box 12.

The screen box 12 has a top cover 20 which completely encloses the screens to prevent the material being screened from contamination by extraneous material and to minimize the escape of dust and fines from the box.

The material to be screened is charged onto the upper end of the screen 13 in screen box 12 from an inlet conduit or chute 25, which is connected via the movable seal 26 of this invention to a port or opening 27 in top cover 20. Thus, particulate material to be screened is fed from the chute 25 through the seal 26 and port 27 onto the upper end of the screen 13. The particulate material entering from the chute 25 then moves downwardly along the length of the screen in the box with the finer materials passing through the screen onto the bottom surface 28 of the box while the tailings 30 pass off of the lower end of the screen into a collector 31 and subsequently to an outlet chute 35. The finer materials which pass through the screen 13 onto the bottom 28 of the screen box move downwardly over the sloping bottom wall 28 into a collector 32 and subsequently out of the machine through an outlet chute 36.

Between each of the collectors 31, 32 and the outlet chutes 35, 36 there are movable seals 26', 26", respectively, identical to the movable seal 26 operable between the inlet chute and the cover of the machine. As is explained more fully hereinafter, these movable seals 26, 26', 26", all function as a conduit between a stationary inlet or outlet chute and a movable portion of the screen box.

The seal 26 comprises an inlet funnel 40 which is bolted or otherwise fixedly secured to the particulate material inlet chute 25. This funnel has a pair of spaced radial rings or flanges 41, 42, welded or otherwise fixedly secured to its periphery. An annular flexible diaphragm 43 is sandwiched between these rings 41, 42, and secured therein by nuts and bolts 44. At its outer edge the flexible diaphragm 43 has a low surface friction ring 45 secured to its underside. Above the low friction ring 45 and on the top side of the resilient diaphragm there is a weighted ring 46. These two rings 45, 46 are secured to the outer edge of the resilient diaphragm by bolts 47 and nuts 48. In the preferred embodiment there are also leaf type springs 49 bolted at one end to the flange 44. The opposite end of this spring is biased against the top surface of weighted ring 46. These leaf springs 49 cooperate with the weighted ring 46 to force the periphery of the rubber diaphragm downwardly and thereby to force the bottom surface of the low surface friction ring 45 into engagement with the flat top surface 51 of a port plate 52. The low surface friction ring 45 is preferably made from a commercially available low friction material, as for example tetrafluoroethylene ("Teflon").

The port plate 52 is bolted or otherwise fixedly secured to an upstanding tube 53, which is welded or otherwise secured to the cover 20 of the screen box. The tube 53 surrounds the orifice or opening 27 in the cover so that particulate material passing through the funnel section 40 of the seal falls downwardly through the cover and onto the screen 13.

In the operation of the screening machine, the motor 17 is operable to cause the complete screen box 12 to move in a vibratory, gyratory, or oscillatory motion from a centered position indicated by centerlines 56, relative to the stationary funnel 40. In the course of such motion of the screen box 12, the port plate 52 and attached inlet tube 53 of the screen box move from one extreme position in which the centerline 56 of the tube 53 is located in the position indicated by line 56' in FIG. 3 to the position 56" illustrated in FIG. 4. During the course of this movement of the port plate relative to the stationary funnel, the port plate 52 moves horizontally beneath the sealing ring 45. That sealing ring 45 is maintained in surface contact with the top surface 51 of the port plate by the weighted ring 46 and leaf spring 49. Consequently, dust or other fine material is prevented from escaping from the enclosed screen box via this movable seal and simultaneously dust or other matter is prevented from entering the screen box 12 and contaminating product contained therein.

The two seals 26', 26" associated with the outlet end of the machine are identical to the inlet seal 26. They differ only in that the port plates 52 of the outlet seals are stationary relative to the funnel shaped collectors 31, 32. In other words, the collectors move relative to the port plates in the outlet seals 26', 26" rather than vice versa, as in the inlet seal 26.

The primary advantage of the movable seals 26, 26' and 26" illustrated and described herein over conventional corrugated rubber hoses which have heretofore been used to connect the inlet and outlet chutes to the enclosed screen box is that these sliding seals fail much less frequently than corrugated hose. Consequently, there are many fewer spills in machines equipped with this movable sliding seal 26, 26', 26" than occur in machines equipped with conventional corrugated flexible tubing.

This movable sliding seal also has the advantage of being useful in much higher temperature applications than can be tolerated by flexible corrugated tubing.

While I have described only a single preferred embodiment of my invention, I do not intend to be limited except by the scope of the following appended claims.

What is claimed is:

1. A screening machine having an enclosed movable member including a screen contained within the movable member for grading a particulate material, said enclosed movable member having an inlet orifice and an outlet orifice,
   a stationary fixed inlet conduit for supplying particulate material to said inlet orifice of said movable member,
   a stationary fixed outlet conduit for transporting graded particulate material away from said outlet orifice of movable member, and
   sealing means operable between at least one of said orifices of said movable member and one of said conduits, said sealing means comprising a flat slide surface surrounding said one orifice, said flat slide surface being fixedly secured to one of said movable member or said conduits, a slide element surrounding said one orifice and slideable over said flat surface, and flexible diaphragm means sealingly interconnecting said slide element to one of said movable member or said conduit.

2. The screening machine of claim 1 in which said slide element is biased into engagement with said slide surface of said movable member.

3. The screening machine of claim 1 in which said slide element is spring biased into engagement with said slide surface of said movable member.

4. The screening machine of claim 1 in which the said sealing means are operable between said inlet orifice and said inlet conduit and between said outlet orifice and said outlet conduit.

5. A screening machine having an enclosed movable member including a screen contained within the movable member for grading a particulate material, said enclosed movable member having an inlet orifice and an outlet orifice,
   a stationary fixed inlet conduit for supplying particulate material to said inlet orifice of said movable member, and
   sealing means operable between said inlet orifice of said movable member and said inlet conduit, said sealing means comprising a flat slide surface surrounding said inlet orifice, said flat slide surface being fixedly secured to said movable member, a slide element surrounding said one orifice and slideable over said flat surface, and flexible diaphragm means sealingly interconnecting said slide element to said inlet conduit.

6. The screening machine of claim 5 in which said slide element is biased into engagement with said slide surface of said movable member.

7. The screening machine of claim 5 in which said slide element is spring biased into engagement with said slide surface of said movable member.

8. A screening machine having an enclosed movable member including a screen contained within the movable member for grading a particulate material, said enclosed movable member having an inlet orifice and an outlet orifice, a stationary fixed inlet conduit for supplying particulate material to said inlet orifice of said movable member, a stationary fixed outlet conduit for transporting graded particulate material away from said outlet orifice of movable member, and sealing means operable between said outlet orifice of said movable member and said outlet conduit, said sealing means comprising a flat slide surface surrounding said outlet orifice, said flat slide surface being fixedly secured to said outlet conduit, a slide element surrounding said outlet orifice and slideable over said flat surface, and flexible diaphragm means sealingly interconnecting said slide element to said movable member.

9. The screening machine of claim 8 in which said slide element is biased into engagement with said slide surface of said movable member.

10. The screening machine of claim 8 in which said slide element is spring biased into engagement with said slide surface of said movable member.